(12) United States Patent
Rose (10) Patent No.: US 7,690,454 B2
(45) Date of Patent: Apr. 6, 2010

(54) HYBRID DRIVE, IN PARTICULAR, FOR A MOTOR VEHICLE

(75) Inventor: Peter Rose, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 12/489,671

(22) Filed: Jun. 23, 2009

(65) Prior Publication Data

US 2009/0288894 A1 Nov. 26, 2009

Related U.S. Application Data

(63) Continuation of application No. PCT/EP2007/011470, filed on Dec. 29, 2007.

(30) Foreign Application Priority Data

Jan. 12, 2007 (DE) ........................ 10 2007 001 840

(51) Int. Cl.
*B60K 6/442* (2007.10)
*B60K 6/445* (2007.10)

(52) U.S. Cl. .............................. 180/65.225; 180/65.23; 180/65.235; 180/65.7

(58) Field of Classification Search .............. 180/65.21, 180/65.22, 65.225, 65.23, 65.235, 65.25, 180/65.6, 65.7, 65.31, 65.245
See application file for complete search history.

(56) References Cited

U.S. PATENT DOCUMENTS

| | | | |
|---|---|---|---|
| 4,410,071 A * | 10/1983 | Osterman ........................ | 477/4 |
| 5,537,967 A | 7/1996 | Tashiro et al. | |
| 5,979,257 A * | 11/1999 | Lawrie .......................... | 74/335 |
| 6,332,257 B1 | 12/2001 | Reed et al. | |
| 2002/0148659 A1 * | 10/2002 | Bordini ..................... | 180/65.2 |
| 2004/0040810 A1 | 3/2004 | Notsu et al. | |
| 2005/0098365 A1 * | 5/2005 | Hanyu et al. ................ | 180/65.2 |
| 2005/0107198 A1 | 5/2005 | Sowul et al. | |

(Continued)

FOREIGN PATENT DOCUMENTS

DE 1032109 6/1958

(Continued)

OTHER PUBLICATIONS

PCT/EP2007/011470 International Search Report dated Jan. 12, 2007.

*Primary Examiner*—Paul N Dickson
*Assistant Examiner*—John R Olszewski
(74) *Attorney, Agent, or Firm*—Taylor & Aust, P.C.

(57) ABSTRACT

A hybrid drive, in particular, for a motor vehicle, includes: an internal combustion engine and a transmission disposed on the output side of the internal combustion engine, which transmission is drivable by the internal combustion engine; and an electric motor associated with the transmission having an electrically driven rotor through which the transmission is additionally drivable. The transmission includes an input shaft that is driven by the internal combustion engine and runs in the longitudinal direction of the transmission, an output shaft to drive a machine disposed on the output side of the transmission, or drive wheels in the case of a vehicle, and a plurality of manually or automatically shiftable gear stages to set the various gear ratios between the input shaft and the output shaft. The electric motor at its longitudinal axis and/or rotational axis of its rotor is attached to the output shaft in parallel or essentially parallel fashion laterally externally to the transmission.

23 Claims, 4 Drawing Sheets

U.S. PATENT DOCUMENTS

2006/0293144 A1    12/2006  Nishina et al.
2008/0156550 A1*  7/2008  Wei et al. .................. 180/65.2

FOREIGN PATENT DOCUMENTS

| | | |
|---|---|---|
| DE | 3030640 A1 | 2/1982 |
| DE | 3627370 A1 | 2/1988 |
| DE | 10008344 A1 | 8/2000 |
| EP | 0604979 A2 | 7/1994 |
| EP | 0916546 A2 | 5/1999 |
| EP | 1452376 A2 | 9/2004 |
| FR | 2832358 B1 | 5/2003 |
| JP | 07247857 A | 9/1995 |

* cited by examiner

HYBRID DRIVE, IN PARTICULAR, FOR A MOTOR VEHICLE

CROSS REFERENCE TO RELATED APPLICATIONS

This is a continuation of PCT application No. PCT/EP2007/011470, entitled "HYBRID DRIVE, PARTICULARLY FOR A MOTOR VEHICLE", filed Dec. 29, 2007, which is incorporated herein by reference.

BACKGROUND OF THE INVENTION

1. Field of the Invention

The invention relates to a hybrid drive, in particular, for a motor vehicle.

2. Description of the Related Art

Conventionally, in a hybrid drive, where this drive is equipped with a single electric motor as in one embodiment of this invention, the electric motor is located between the internal combustion engine and transmission that is disposed on the output side of the internal combustion engine. Within the meaning of this description, what is meant by disposed on the output side is that the transmission has an input shaft that is driven by the internal combustion engine so as to drive an output shaft of the transmission, where this output shaft is in turn in driving connection with the machine, or in the case of a vehicle with the drive wheels. In terms of the flow of driving power, and in particular also in the axial direction of the crankshaft of the internal combustion engine, the transmission is thus disposed behind the internal combustion engine.

For example, the internal combustion engine, electric motor, and transmission immediately follow one another in the prior art. This results in a situation where the requisite overall axial length for the complete drive comprising the three referenced systems is lengthened in comparison with a conventional drive that is equipped only with an internal combustion engine and a transmission attached thereto. Due to the limited installation space available, in particular, in a motor vehicle, this axial extension is undesirable and also impedes retrofitting a vehicle propelled conventionally by an internal combustion engine with an electric motor so as to create a hybrid drive.

Reference is made to the following documents that provide the prior art in printed publications:
  US 2006/0293144 A1
  US 2004/0040810 A1
  DE 100 08 344 A1
  U.S. Pat. No. 5,537,967
  DE 36 27 370 A1
  DE-AS 1 032 109
  DE 30 30 640 A1
  FR 2 832 358 B1
  U.S. Pat. No. 6,332,257 B1

What is needed in the art is a hybrid drive which is not extended, or extended only insignificantly, in its axial length as compared with a conventional drive system. In particular, what is needed in the art is that the hybrid drive be producible, installable, and retrofittable in a cost-effective manner. Finally, what is needed in the art is that it be advantageously possible to employ electric motors of different output sizes, and thus various overall sizes, in one and the same drivetrain having an internal combustion engine so as to be able to create an individually desired hybrid drive by appropriately selecting an electric motor from a multiplicity of electric motors of varying size. What is also needed in the art is that the linking of the electric motor to the transmission, in other words, creating the driving connection between the electric motor and the transmission be designed such that it does not interferingly encroach upon the hydrodynamic components that are sealed from the environment, in particular, the hydrodynamic torque converter provided within the transmission.

SUMMARY OF THE INVENTION

The term hybrid drive as defined by the present invention refers to a drive system that has an electric motor in addition to an internal combustion engine by which generally to drive a machine, or to drive the drive wheels in the case of a vehicle, selectively by way of the internal combustion engine or the electric motor. Combined operation involving the simultaneous propulsion of the machine, or of the vehicle, by the internal combustion engine and the electric motor is also possible.

The present invention provides a hybrid drive, in particular for a motor vehicle, including: an internal combustion engine and a transmission disposed on the output side of the internal combustion engine, which transmission is drivable by the internal combustion engine; and an electric motor associated with the transmission and having an electrically driven rotor through which the transmission is additionally drivable. The transmission includes an input shaft that is driven by the internal combustion engine and runs in the longitudinal direction of the transmission, an output shaft to drive a machine disposed on the output side of the transmission, or, in the case of a vehicle, the drive wheels, and a plurality of manually or automatically shiftable gear stages for setting different gear ratios between the input shaft and the output shaft. The electric motor is attached to the transmission laterally externally by its longitudinal axis and/or rotational axis of its rotor parallel or essentially parallel to the input shaft. The transmission has a hydrodynamic torque converter, and a differential gear disposed, as viewed in the direction of the power flow from the input shaft to the output shaft, ahead of the hydrodynamic torque converter, the differential gear functioning to split the power flow simultaneous between the hydrodynamic torque converter and a mechanical power take-off disposed within the power flow parallel to the hydrodynamic torque converter, wherein the electric motor is in a driving connection with one input of the differential gear to feed driving power from the electric motor through the differential gear into the transmission.

The hybrid drive according to the invention, in particular, motor-vehicle hybrid drive, has an internal combustion engine and a transmission connected on the output side of the internal combustion engine, wherein this last component is drivable by the internal combustion engine. In addition, an electric motor having an electrically driven rotor is provided through which the transmission is additionally drivable. The electric motor is, for example, connected to the transmission within the transmission or its housing, or connected externally to the transmission, or generally associated with the transmission such that the rotor is in driving connection at least indirectly with the output shaft of the transmission, in particular, in a direct driving connection, for example, through gear stages, in particular, one or two gear stages, with the input shaft of the transmission, or is in driving connection with a component that is rotationally fixed to this input shaft.

The input shaft of the transmission is furthermore drivable by the internal combustion engine and runs longitudinally relative to the transmission. The shaft is in an indirect driving connection with the output shaft of the transmission, a plurality of manually or automatically shiftable gear stages being provided to set the different gear ratios between the input shaft and the output shaft within the driving connection.

According to the invention, the electric motor is attached laterally externally on the transmission by its longitudinal axis and/or its rotational axis—that is, the axis through which the rotor runs—parallel or essentially parallel to the input shaft. Laterally externally on the transmission here means that even though the electric motor can be enclosed by the transmission housing, this motor is located essentially radially externally to, or viewed longitudinally, adjacent to the transmission stages or various clutches, in particular, multi-disk clutches that this type of transmission has. The longitudinal axis of the electric motor is defined by the motor's outer dimensions and extends in the direction of its greatest extent. It is thus possible to speak in terms of the arrangement of the electric motor being parallel to the transmission.

In one embodiment of the invention, the output shaft is also disposed in the longitudinal direction of the transmission and in particular aligns with the input shaft. In this embodiment, the output shaft is thus also disposed parallel to the rotational axis and/or the longitudinal axis of the electric motor.

In order to provide especially convenient access to the electric motor from outside the transmission—for example, to service or replace it or to retrofit the electric motor—in one embodiment of the invention the electric motor is disposed on an auxiliary power take-off of the transmission. That is, its introduction of power is effected in parallel to the introduction of power from the input shaft into the transmission through a driving connection, for example, a gear stage, which emerges laterally externally out of the transmission. The introduction of power from the electric motor into the transmission is effected here, as viewed in the direction of the driving power flow from the input shaft to the output shaft, advantageously ahead of the shiftable gear stages in the transmission, and according to the invention ahead of the hydrodynamic torque converter that is typically provided in an automated manual transmission or automatic transmission. For example, in the region of the drive face of the transmission the input shaft has a gear. What is meant by drive face of the transmission here is the end face of the transmission facing the internal combustion engine by which the transmission is directly connected to the internal combustion engine. The gear supported by the input shaft can directly mesh with a gear on the rotor of the electric motor, or an intermediate gear can be provided between the gear supported by the input shaft and the rotor gear of the electric motor, which gear meshes both with the gear on the input shaft as well as with the rotor gear.

Alternatively, it is also possible to create a driving connection through a V-belt or a chain. In this case, the input shaft can support a pulley or a sprocket wheel that is connected to a corresponding pulley or sprocket wheel through a belt, toothed belt, V-belt, chain, or the like, which pulley or sprocket wheel is associated with the electric motor rotor or is supported by this rotor.

In order to be able to connect a comparatively small electric motor of relatively high power to the transmission through a relatively high speed, the introduction of power from the driving power of the electric motor into the transmission is advantageously effected through a gear reduction stage. This means that the speed of the rotor of the electric motor is greater than that of the input shaft of the transmission, which shaft is driven by the rotor, in particular, of the input shaft or of a rotational element rotating at the speed of the input shaft and, in particular, attached to the input shaft in a rotationally fixed manner. The reduction ratio is, for example, 1:3, meaning that the rotor of the electric motor runs three times as fast as the transmission input shaft or the input shaft.

The electric motor is advantageously designed as an asynchronous machine that in particular has an extent in the direction of its rotational axis that is greater than the diameter. The asynchronous machine can thus be called long and thin, whereas conventional electric motors which are disposed between the internal combustion engine and the transmission must be called short and fat since these generally are of a larger diameter than their axial extent.

The electric motor can, for example, be in a continuous driving connection with the transmission, in particular, the input shaft. The motor is thus not decouplable from the transmission or the input shaft; a releasable clutch or engaging/disengaging clutch can thus be eliminated.

In a first embodiment, a disconnect-type clutch can be provided between the internal combustion engine and the transmission input shaft so as to be able to decouple the internal combustion engine from the transmission or the drive wheels. In a second embodiment, the driving connection too does not have any such disconnect-type clutch. In this case, the crankshaft of the internal combustion engine is in coupled motion during the purely electric-motor drive state, while the internal combustion engine and the electric motor, or the crankshaft of the internal combustion engine and the rotor of the electric motor, are in particular in a continuous non-releasable driving connection.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 4:
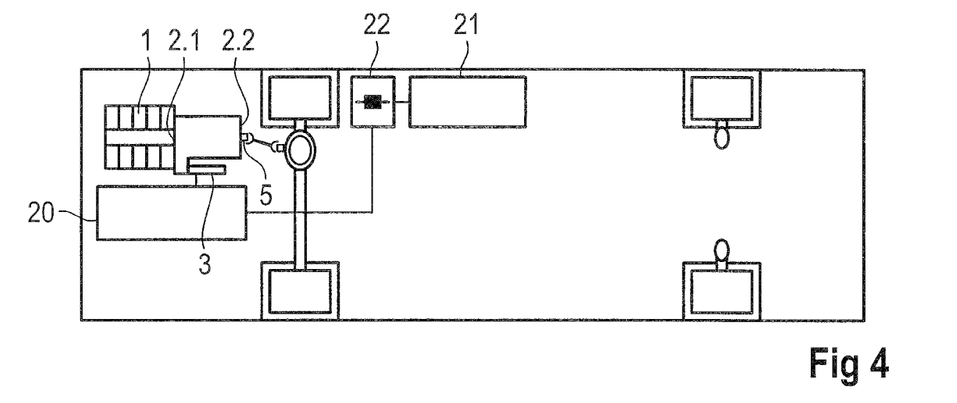
FIG. 4 is a schematic view of the arrangement of a hybrid drive according to the invention in a motor vehicle, for example, a bus.

Referring now to the drawings, and more particularly to FIG. 4, there is shown the internal combustion engine 1, the transmission 2 connected on the output side of the engine, and the electric motor 3 disposed parallel to the transmission. On its drive face 2.1 facing internal combustion engine 1, transmission 2 supports an input shaft (not shown) that is driven by internal combustion engine 1. On its output face 2.2, which is disposed opposite drive face 2.1, what is seen is the output shaft 5 that is connected through an articulated shaft with the differential of a driving axle.

Electric motor 3, which in the embodiment shown is designed as an asynchronous machine, is connected through an inverter 20 to a storage device for electrical energy, in particular, a battery 21. As a result, it is possible to use electric motor 3 as a generator in order to convert mechanical energy into electrical energy when the vehicle is to be braked and to store it in battery 21. In other operational states in which the vehicle is then accelerated or propelled electrically, electric motor 3 is driven by the energy from battery 21 and transmits a driving torque through transmission 2 to the drive shaft or the drive wheels of the vehicle. An appropriate control device that controls the charging of battery 21, or the discharging and thus driving of electric motor 3, is identified by reference 22.

What is seen in FIGS. 1 and 2 once again is the parallel arrangement of electric motor 3 relative to transmission 2—see the indicated rotational axis 16 of electric motor 3—that runs parallel to the rotational axis 17 of transmission 2. Rotational axis 17 of transmission 2 here is that rotational axis through which input shaft 4 and/or output shaft 5 of transmission 2 rotates. Rotational axis 16 in the embodiment shown corresponds to the longitudinal axis 10 of electric motor 3, where longitudinal axis 10 is defined by the longer extent of electric motor 3 in this direction as compared to its diameter.

Figure 1:
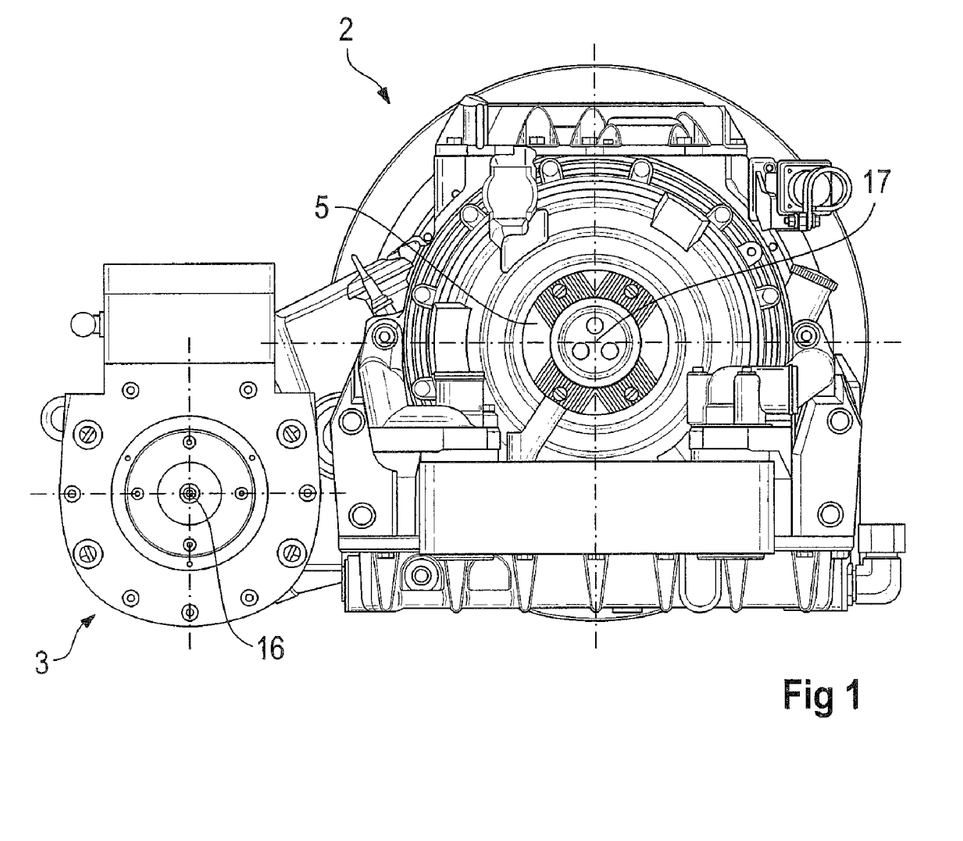
FIG. 1 is a top view of the output face of the transmission and the corresponding end face of the electric motor disposed parallel thereto.
Figure 2:
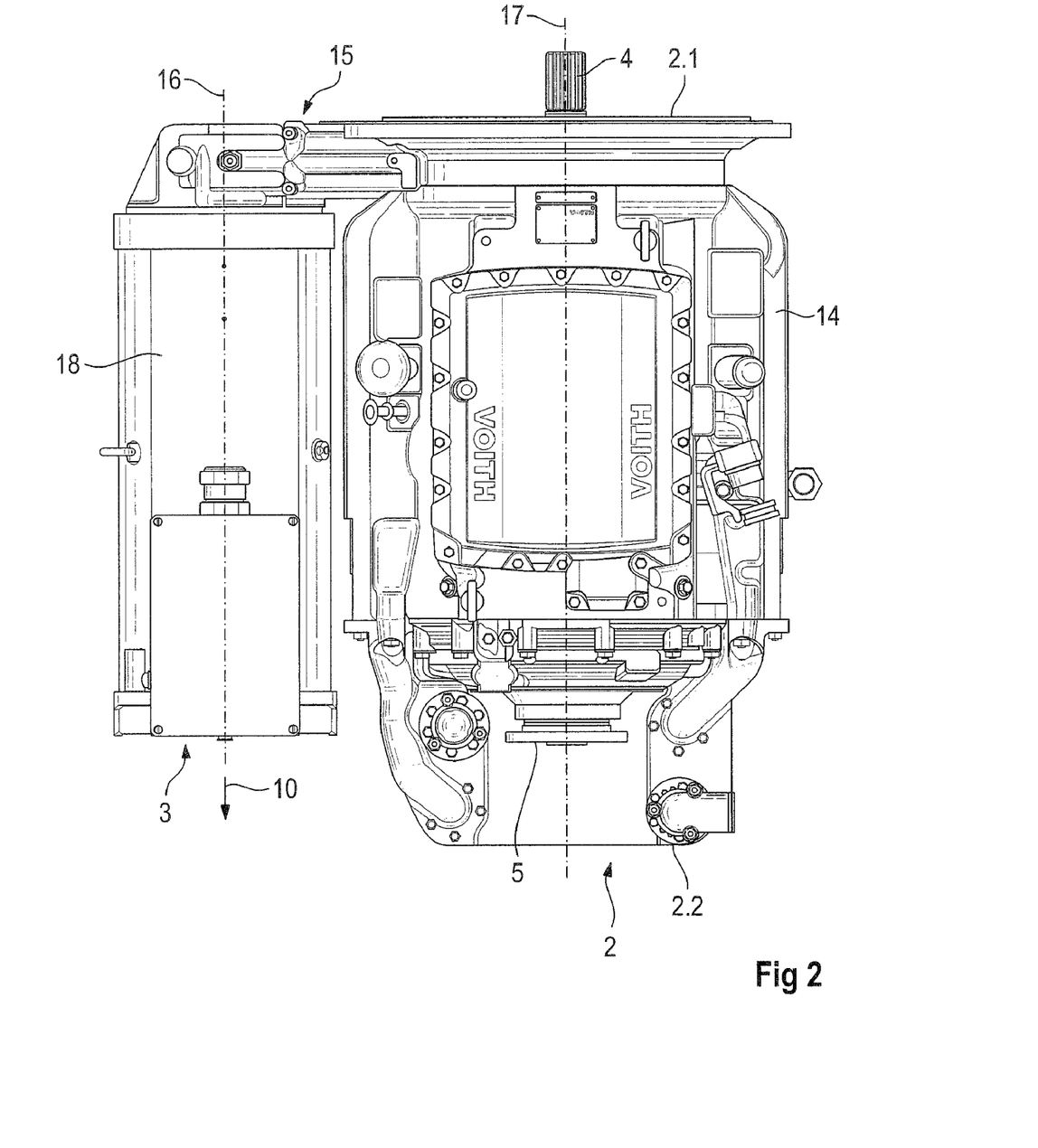
FIG. 2 is a top view of the transmission and the electric motor attached laterally thereto.

In the embodiment shown, electric motor 3 is in an overhung position relative to transmission 2, specifically by way of a bracket 15 that is implemented in the region of drive face 2.1 of transmission 2 on transmission housing 14. Housing 18 of the electric motor is attached in positive-locking fashion, in particular, flanged on by a bolt connection, to bracket 15, or to that section of transmission housing 14 which forms bracket 15.

Figure 3:
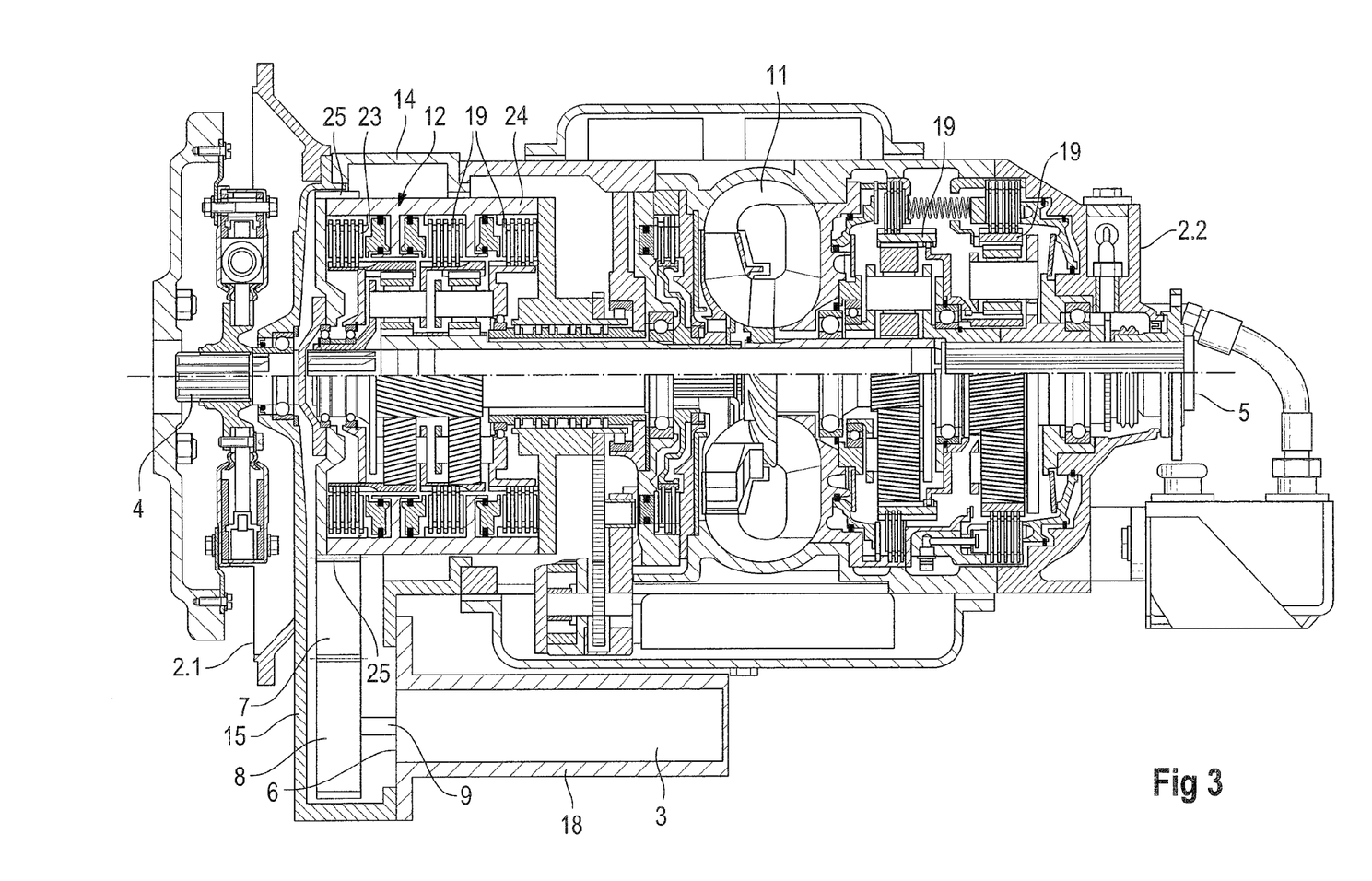
FIG. 3 is a schematic sectional view in an axial section through an electric motor and a transmission indicated in FIG. 2, wherein, however, the electric motor is illustrated schematically below the transmission where it can also be disposed.

Seen again in FIG. 3 is the "inner works" that are enclosed by housing 18 of electric motor 3 and transmission housing 14. What is thus evident is that transmission housing 14, as viewed from its drive face 2.1 in the direction of its output face 2.2, first of all encloses a differential gear 12 by which driving power from input shaft 4 can be transmitted simultaneously through hydrodynamic torque converter 11, which is disposed much further back within transmission 2, as well as through a purely mechanical drive branch disposed parallel to hydrodynamic torque converter 11, onto output shaft 5 through various gear stages 19, comprising planetary gear and multi-disk clutches for shifting into forward gears and at least one reverse gear. In addition, one more input clutch 23 is disposed within gear housing 14 ahead of differential gear 12 for the purpose of selectively interrupting or shifting through the driving connection between the internal combustion engine (not shown in FIG. 3) or input shaft 4 and a so-called input cage 24. Input cage 24 here forms that rotation element rotating at the speed of input shaft 4 when input clutch 23 is engaged, which element accommodates the components of differential gear 12 as well as additional clutches for the driving speeds.

Input cage 24 supports an external gear 25 on its radial outer circumference that creates the power take-off from transmission 2 to electric motor 3. This external gear 25 is disposed in either an oil-filled space sealed from the environment or an oil-free space that is then filled, for example, with air at atmospheric-air pressure, and in particular, is not sealed in a fluid-tight manner from the environment. Typically, however, the design using an (at least partially) oil-filled space is preferred to allow lubrication of the gears.

External gear 25 meshes with an intermediate gear 7 that in turn meshes with a rotor gear 8 on rotor 9 of electric motor 3. The rotational axes of external gear 25, intermediate gear 7, rotor gear 8, and rotor 9—where the rotational axis of rotor 9 aligns with that of rotor gear 8—thus run parallel to each other and parallel to input shaft 4.

In the embodiment shown in FIG. 3, external gear 25 of input cage 24 thus constitutes an auxiliary power take-off (out) or auxiliary power take-off (in), depending on the direction of the power flow from transmission 2 to electric motor 3 or from electric motor 3 into transmission 2. Due to the relatively greater diameter of external gear 25 as compared with rotor gear 8 or intermediate gear 7, a reduction gear is formed between electric motor 3 and input cage 24 or input shaft 4 (as relates to the situation of the propulsion by electric motor 3), with the result that electric motor 3 can operate at a relatively high speed, thereby providing high driving power within a relatively small design space. As viewed from the operating point of electric motor 3 working as a generator, these gear stages constitute a step-up gearing.

Seen again in FIG. 3 is the overhung position of electric motor 3. Electric motor 3 together with its housing 18 is supported only at their end face 6 by a bolt connection between electric motor housing 18 and transmission housing 14 or bracket 15 on which rotor 9 of electric motor 3 is disposed. This allows for especially easy replacement of electric motor 3 and cost-effective installation. In the case where the driving connection between electric motor 3 and transmission 2 is designed in the form of oil-operated gear stages, it is possible to achieve an especially easy seal between electric motor housing 18 and transmission housing 14.

It is obvious that the arrangement according to the invention of electric motor 3 parallel and laterally external to transmission 2—where laterally refers both to a position to the right and left of rotational axis 17 of the transmission or of input shaft 4, as well as to a position above or below the transmission—can also be effected using an additional mounting of the electric motor on the transmission or in the region of its side facing the transmission.

Figure 5:
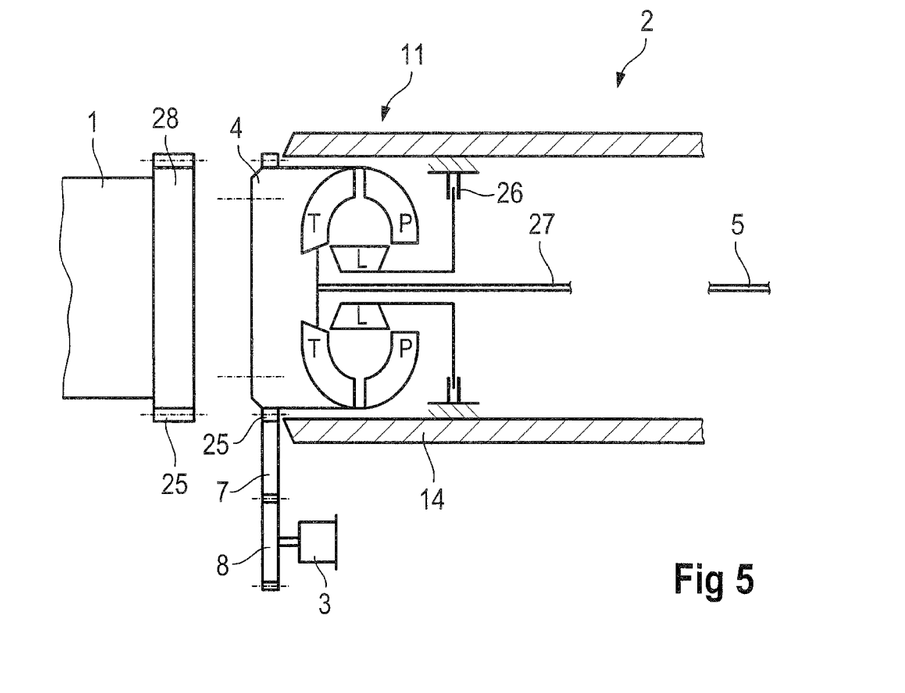
FIG. 5 is a schematic sectional view based on FIG. 3 having an introduction of the driving power from the electric motor ahead of the hydrodynamic circuit of a hydrodynamic torque converter through the converter bell housing or the flywheel of the electric motor.

FIG. 5 illustrates one possible introduction of driving power from electric motor 3 into transmission 2, as viewed in the flow direction of driving power from internal combustion engine 1 to output shaft 5, ahead of the hydrodynamic circuit of hydrodynamic torque converter 11 integrated in transmission 2. Here, for example, converter 11 can, as shown here, be disposed in the region of the transmission input such that its impeller P is driven directly by input shaft 4, or input shaft 4 is designed in the form of the driven converter housing or the converter bell housing to which impeller P is connected in a rotationally fixed manner or implemented as an integrally formed piece.

Converter 11 can be designed as a trilock converter having a selectively lockable stator L (see the parking brake or clutch 26 between stationary converter housing 14 and stator L that is implemented, for example, as a multi-disk clutch). Alternatively, it is also possible to provide another converter, for example, one in which stator L is always fixed.

Reference T identifies the turbine of converter 11, the turbine being in a driving connection with a converter output shaft 27 or being supported by this shaft.

The converter housing or converter bell housing that in the embodiment shown forms input shaft 4, supports an external gear 25 on its outer circumference, which gear is drivable or is driven by electric motor 3. Otherwise, the design of the auxiliary power take-off corresponds to that of the design of FIG. 3 (see rotor gear 8 and intermediate gear 7).

Alternatively, flywheel 28 of the electric motor, which is disposed directly on the drive face 2.1 of transmission 2 within or external to transmission housing 14, can support a corresponding external gear 25 through which the driving power from electric motor 3 is introduced into the transmission or onto input shaft 4.

The advantage of introducing the driving power from the electric motor into the transmission ahead of a hydrodynamic torque converter in terms of the power flow direction from the internal combustion engine to the transmission output shaft consists in the fact that the conversion of the hydrodynamic torque converter in the operating state can be used with electric-motor propulsion. If, for example, the electric motor can provide a torque of 400 Nm and a torque multiplication with a factor of 3 is possible using the converter, then the transmission output shaft or the vehicle can be driven at 1,200 Nm, which matches the torque of a typical current diesel engine in commercial vehicles. For example, a truck can thus be propelled solely by an electric motor using a relatively low-torque electric motor.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hybrid drive, comprising:
an internal combustion engine including an output side;
a transmission disposed on said output side of said internal combustion engine, said transmission being drivable by said internal combustion engine, said transmission including an input shaft that is driven by said internal combustion engine and that runs in a longitudinal direction of said transmission, an output side, an output shaft to drive one of a machine disposed on said output side of said transmission and, in a case of a motor vehicle, a plurality of drive wheels, a plurality of one of manually and automatically shiftable gear stages for setting a plurality of different gear ratios between said input shaft and said output shaft, a hydrodynamic torque converter, a differential gear disposed, as viewed in a direction of a power flow from said input shaft to said output shaft, ahead of said hydrodynamic torque converter, and a mechanical power take-off, said differential gear splitting said power flow simultaneously between said hydrodynamic torque converter and said mechanical power take-off disposed within said power flow parallel to said hydrodynamic torque converter;
an electric motor associated with said transmission and including an electrically driven rotor through which said transmission is additionally drivable, said electric motor being attached to said transmission laterally externally by at least one of a longitudinal axis of said electric motor and a rotational axis of said rotor of said electric motor one of parallel and essentially parallel to said input shaft, said electric motor being in a driving connection with one input of said differential gear to feed a driving power from said electric motor through said differential gear into said transmission.

2. The hybrid drive according to claim 1, wherein the hybrid drive is for a motor vehicle.

3. The hybrid drive according to claim 1, wherein said differential gear has an external wheel drive accommodating at least one of a plurality of gear stages and a plurality of clutches of said transmission that is driven by said electric motor.

4. The hybrid drive according to claim 3, wherein said plurality of clutches includes a plurality of multi-disk clutches.

5. The hybrid drive according to claim 1, wherein said differential gear has an external wheel drive accommodating an external gear of said transmission that is driven by said electric motor.

6. The hybrid drive according to claim 1, wherein said output shaft runs in said longitudinal direction of said transmission.

7. The hybrid drive according to claim 1, wherein said output shaft runs in said longitudinal direction of said transmission and is aligned with said input shaft.

8. The hybrid drive according to claim 1, wherein said output shaft runs in said longitudinal direction of said transmission and is parallel to said rotational axis of said electric motor.

9. The hybrid drive according to claim 1, wherein said electric motor is in a driving connection with an auxiliary power take-off of said transmission, through which said auxiliary power take-off said driving power from said electric motor is introducible, as viewed in said direction of said power flow from said input shaft to said output shaft, ahead of said shiftable gear stages.

10. The hybrid drive according to claim 9, wherein said input shaft supports a gear of said transmission in a region of said transmission corresponding to a drive face of said transmission facing said internal combustion engine, said gear being, through an intermediate gear, in a driving connection with a rotor gear on said electrically driven rotor of said electric motor.

11. The hybrid drive according to claim 9, wherein said input shaft is attached in a rotationally fixed manner to a gear of said transmission in a region of said transmission corresponding to a drive face of said transmission facing said internal combustion engine, said gear being, through an intermediate gear, in a driving connection with a rotor gear on said electrically driven rotor of said electric motor.

12. The hybrid drive according to claim 9, wherein said input shaft one of has and is attached in a rotationally fixed manner to a pulley in a region of said transmission corresponding to a drive face of said transmission facing said internal combustion engine, said pulley being in a driving connection through at least one belt with said rotor of said electric motor.

13. The hybrid drive according to claim 12, wherein said belt is one of a V-belt and a toothed belt.

14. The hybrid drive according to claim 9, wherein said input shaft one of has and is attached in a rotationally fixed manner to a pulley in a region of said transmission corresponding to a drive face of said transmission facing said internal combustion engine, said pulley being in a driving connection through at least one belt with said rotor of said electric motor through a second pulley supported by said rotor.

15. The hybrid drive according to claim 1, wherein said electric motor is in a driving connection with an auxiliary power take-off of said transmission, through which said auxiliary power take-off said driving power from said electric motor is introducible, as viewed in said direction of said power flow from said input shaft to said output shaft, ahead of said hydrodynamic torque converter provided in said transmission.

16. The hybrid drive according to claim 1, wherein said electric motor is in a driving connection with an auxiliary power take-off of said transmission, through which said driving power from said electric motor is introducible, as viewed in said direction of said power flow from said input shaft to said output shaft, ahead of said hydrodynamic torque converter provided in said transmission, and is introducible one of onto said input shaft and behind said input shaft into said transmission.

17. The hybrid drive according to claim 1, wherein said electric motor is connected through at least one reduction stage to said transmission.

18. The hybrid drive according to claim 1, wherein said electric motor is connected through at least one reduction stage to said input shaft of said transmission.

19. The hybrid drive according to claim 1, wherein said electric motor is connected through at least one reduction stage to a rotational element of said transmission, said rotational element rotating at a speed of said input shaft, said rotational element being attached in a rotationally fixed manner to said input shaft.

20. The hybrid drive according to claim 1, wherein said electric motor is in a driving connection with one of a gear and a pulley in said transmission, said one of said gear and said pulley being disposed within said transmission in one of an oil-free space and an oil-filled space sealed from the environment.

21. The hybrid drive according to claim 1, wherein said electric motor, at an end face of said electric motor on which said rotor is disposed, is mounted in an overhung position on a housing of said transmission, said housing enclosing a plurality of components of said transmission and said driving connection between said electric motor and said transmission.

22. The hybrid drive according to claim 21, wherein said electric motor, at an end face of said electric motor on which said rotor is disposed, is mounted in an overhung position on a housing of said transmission, said housing enclosing a plurality of components of said transmission and said driving connection between said electric motor and said transmission including said rotor.

23. The hybrid drive according to claim 21, wherein said housing of said transmission includes a bracket enclosing said driving connection between said electric motor and said transmission, said bracket being disposed in a region of said transmission corresponding to a drive face of said transmission facing said internal combustion engine, said bracket running perpendicular to said input shaft.

* * * * *